US010330112B2

(12) United States Patent
Roche

(10) Patent No.: US 10,330,112 B2
(45) Date of Patent: Jun. 25, 2019

(54) FAN BLADE WITH ROOT THROUGH HOLES

(71) Applicant: United Technologies Corporation, Farmington, CT (US)

(72) Inventor: Charles H. Roche, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 407 days.

(21) Appl. No.: 15/109,217

(22) PCT Filed: Aug. 15, 2014

(86) PCT No.: PCT/US2014/051196
§ 371 (c)(1),
(2) Date: Jun. 30, 2016

(87) PCT Pub. No.: WO2015/102676
PCT Pub. Date: Jul. 9, 2015

(65) Prior Publication Data
US 2016/0327055 A1     Nov. 10, 2016

Related U.S. Application Data

(60) Provisional application No. 61/921,719, filed on Dec. 30, 2013.

(51) Int. Cl.
    *F01D 5/18*     (2006.01)
    *F04D 29/38*     (2006.01)
    (Continued)

(52) U.S. Cl.
    CPC ........... *F04D 29/388* (2013.01); *F01D 5/147* (2013.01); *F01D 5/282* (2013.01); *F01D 5/3007* (2013.01);
    (Continued)

(58) Field of Classification Search
    CPC .. F01D 5/147; F01D 5/3007; F05D 2240/306; F05D 2260/94; F04D 29/388
    See application file for complete search history.

(56) References Cited

U.S. PATENT DOCUMENTS

| 5,407,326 A | * 4/1995 | Lardellier | F01D 5/147 |
| | | | 416/232 |
| 5,634,771 A | 6/1997 | Howard et al. | |
| | (Continued) | | |

FOREIGN PATENT DOCUMENTS

| EP | 0924381 A2 | 6/1999 | |
| EP | 0926312 A2 | 6/1999 | |
| GB | 844068 A | * 8/1960 | B21C 23/16 |

OTHER PUBLICATIONS

International Search Report for International Application No. PCT/US2014/051196; dated Nov. 24, 2014.
(Continued)

Primary Examiner — Ninh H. Nguyen
(74) Attorney, Agent, or Firm — Cantor Colburn LLP

(57) ABSTRACT

A lightweight fan blade for use in turbofan gas turbine engines is disclosed. The fan blade includes a metallic airfoil connected to a root. The airfoil has a pressure side and a suction side. The suction side of the airfoil includes one or more cavities for weight reduction purposes. A cover is attached to the suction side of the body to cover or enclose the one or more cavities. In addition to the one or more cavities, through holes are formed from the inner face of the root into one or more of the cavities for further weight reduction. The through holes may be covered by a spacer and one or more through holes may be extended from the inner face of the root into each of the cavities.

19 Claims, 3 Drawing Sheets

(51) Int. Cl.
*F01D 5/14* (2006.01)
*F01D 5/30* (2006.01)
*F01D 5/28* (2006.01)
*F04D 19/00* (2006.01)
*F04D 29/02* (2006.01)
*F04D 29/32* (2006.01)
*F04D 29/34* (2006.01)

(52) U.S. Cl.
CPC ......... *F04D 19/002* (2013.01); *F04D 29/023* (2013.01); *F04D 29/325* (2013.01); *F04D 29/34* (2013.01); *F05B 2220/302* (2013.01); *F05B 2230/60* (2013.01); *F05B 2220/36* (2013.01); *F05D 2240/306* (2013.01); *F05D 2260/94* (2013.01); *Y02T 50/672* (2013.01); *Y02T 50/673* (2013.01)

(56) References Cited

U.S. PATENT DOCUMENTS

| | | | |
|---|---|---|---|
| 5,692,881 A | 12/1997 | Leibfried | |
| 6,296,172 B1 | 10/2001 | Miller | |
| 6,431,837 B1 | 8/2002 | Velicki | |
| 7,118,346 B2 * | 10/2006 | Read | F01D 5/16 416/232 |
| 7,972,116 B2 * | 7/2011 | Read | F01D 5/147 29/889.72 |
| 8,366,378 B2 * | 2/2013 | Beckford | F01D 5/282 415/9 |
| 8,545,183 B2 | 10/2013 | Webb | |
| 2004/0169022 A1 | 9/2004 | Mega et al. | |
| 2008/0014095 A1 | 1/2008 | Moniz | |

OTHER PUBLICATIONS

Written Opinion for International Application No. PCT/US2014/051196; dated Nov. 24, 2014.
Supplementary European Search Report for Application No. EP 14 87 7448.

* cited by examiner

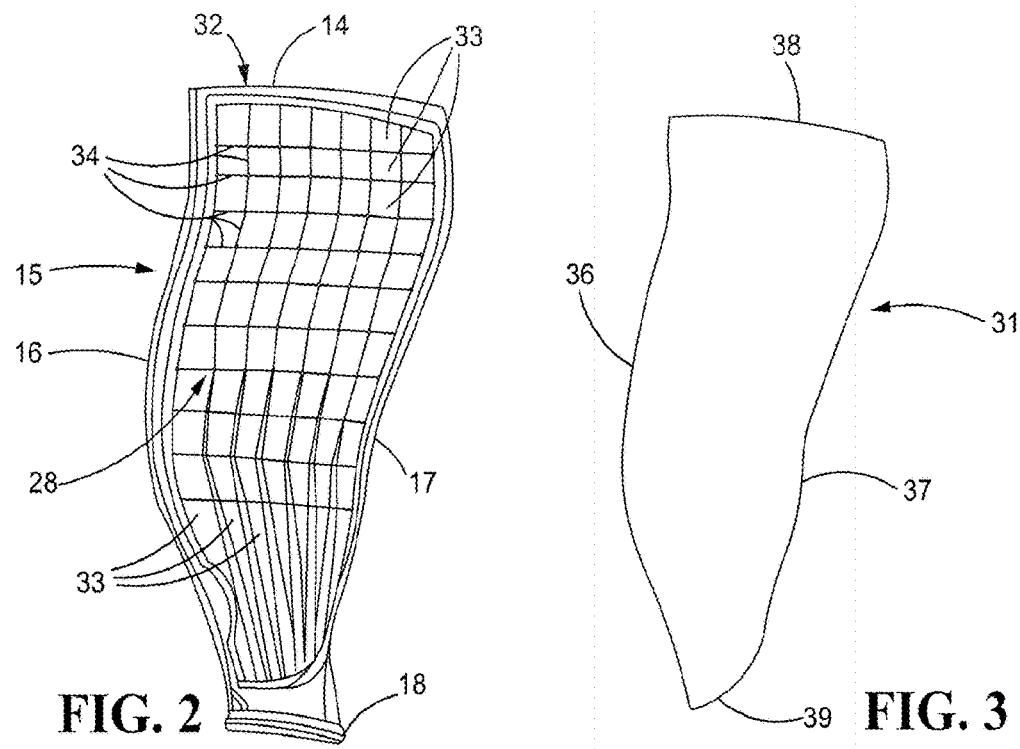
FIG. 2
FIG. 3
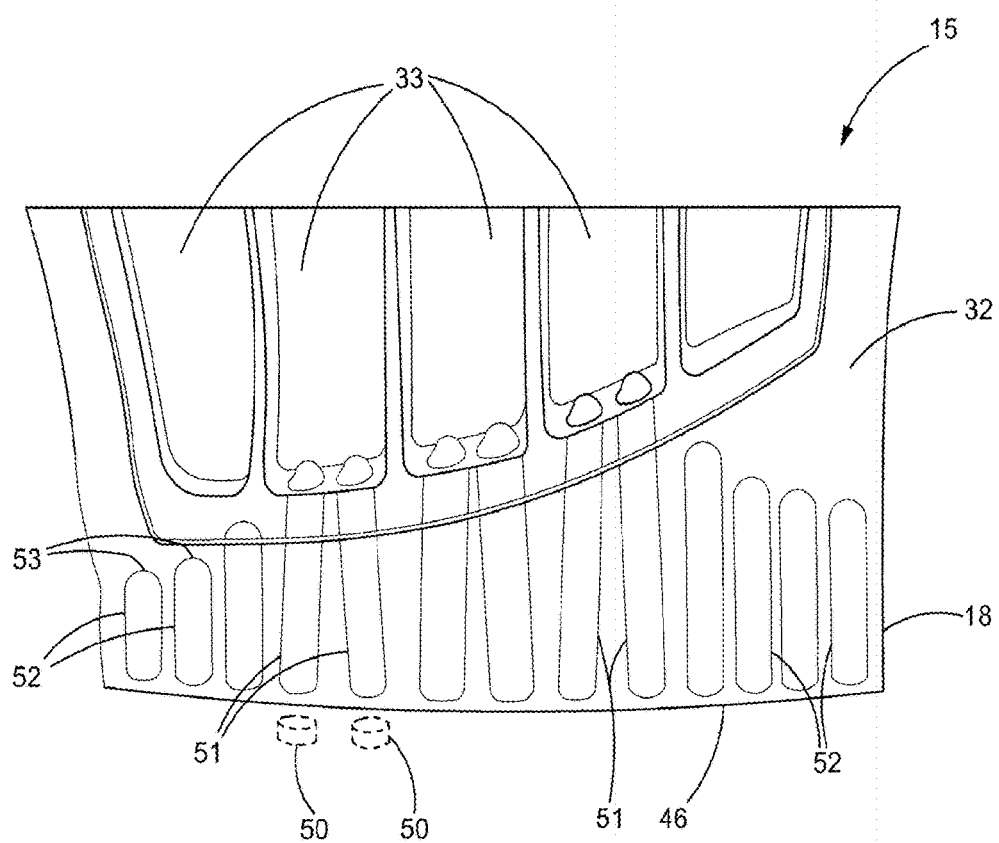
FIG. 4

FAN BLADE WITH ROOT THROUGH HOLES

This application is a National Phase Application of Patent Application PCT/US2014/051196 filed on Aug. 15, 2014, which claims the benefit of and priority to U.S. Provisional Patent Application No. 61/921,719 filed Dec. 30, 2013, the contents each of which are incorporated herein by reference in their entirety.

BACKGROUND

Technical Field

Disclosed herein are fan blades for gas turbine engines and methods of manufacturing such fan blades. The disclosed fan blades include at least one cavity in the airfoil section of the fan blade and at least one through hole that extends from the root of the fan blade to the cavity.

Description of the Related Art

In the field of gas turbine engines used for aircraft, weight reduction results in fuel savings. One known means for reducing the weight of a gas turbine engine is to include hollow cavities in some of the components that do not need to be solid metal or solid composite material to meet structural requirements. One such component is a fan blade, also known as a type of airfoil. Some fan blades include a titanium or aluminum body with recesses or cavities disposed in the non-flow path convex side of the fan blade, also known as the suction side of the fan blade. The opposite side of the fan blade is the concave or pressure side. The cavities may be covered by a composite cover, typically made from fibers and resin. The cover is may be coated with a damage resistant coating.

While fan blades with cavities contribute to weight reduction, there is a continuing need for additional means for reducing the weight of gas turbine engine components while not adversely affecting the strength of the component. This need still extends to fan blades, including fan blades with covered cavities as discussed above. Consequently, there is a continued need for improved fan blade designs that are lightweight, but structurally strong enough to meet all operating requirements.

SUMMARY OF THE DISCLOSURE

In one aspect, a light weight fan blade for a gas turbine engine is disclosed. The fan blade may include an airfoil connected to a root. The airfoil may include a pressure side and a suction side. The suction side may include at least one cavity. The fan blade may further include at least one through hole extending through the root to the cavity.

In another aspect, a fan blade assembly is disclosed. The disclosed fan blade assembly may include a hub coupled to a plurality of radially outwardly extending fan blades. Each fan blade may include an airfoil connected to a root. Each airfoil may include a pressure side and a suction side. Each suction side may include at least one cavity. And, each fan blade may also include at least one through hole extending from the root to the cavity of its respective fan blade.

In yet another aspect, a method for fabricating a fan blade of a gas turbine engine is disclosed. The disclosed method may include manufacturing a body that includes an airfoil and a root. The airfoil may include a pressure side and a suction side. The suction side may include at least one cavity. The method may further include forming at least one through hole through the root and into the cavity. The through hole may be formed by drilling, ball end milling, laser hole manufacturing or other techniques known to those skilled in the art. The method may further include covering the cavity with a cover.

In any one or more of the embodiments described above, each root may include an inner face disposed between and connected to a pair of pressure faces. The pressure faces may extend from the interface to the airfoil. Further, the through hole may extend from the inner face of the root to the cavity.

In any one or more of the embodiments described above, the through hole(s) may be capped or plugged at the inner face of the root to prevent migration of condensation.

In any one or more of the embodiments described above, the at least one through hole is a plurality of through holes.

In any one or more of the embodiments described above, a cover may be disposed over the cavity and adhered to the suction side of the airfoil.

In any one or more of the embodiments described above, the cavity may include a plurality of cavities.

In any one or more of the embodiments described above, the fan blade may further include a plurality of through holes, each through hole extending from the root to one of the plurality of cavities.

In any one or more of the embodiments described above, the cover for the cavity or cavities may be fabricated from fibers and resin.

In any one or more of the embodiments described above, the cover for the cavity or cavities may be fabricated from a fluoroelastomer.

In any one or more of the embodiments described above, the cavity may include at least three cavities and the through hole may include at least six through holes, with two through holes extending from the root to each cavity.

In any one or more of the embodiments described above, the fan blade may further include at least one hole that extends from the root into the airfoil, but which terminates short of the cavity or cavities.

In any one or more of the embodiments described above, the cavity may include a plurality of cavities and the through hole may include a plurality of through holes. Each through hole may extend from the root to one of the cavities. Further, the fan blade may further include at least one hole that extends from the root into the airfoil, but which terminates short of any of the plurality of cavities. In a further refinement of this concept, the fan blade may include a plurality of holes that extend from the root into the airfoil, but which terminate short of any of the plurality of cavities.

In any one or more of the embodiments described above, the inner face of the root may be covered with a spacer that is received in a slot in the rotor that accommodates the root of the airfoil. More specifically, the spacer may be sandwiched between the inner face of the root and the base surface of the slot in the rotor that accommodates the root of the fan blade.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein:

FIG. 2 is a plan view of the suction side of the fan blade body of the fan blade disclosed in FIG. 1, illustrating the placement of cavities in the suction side.

FIG. 3 is a plan view of a disclosed cover for the suction side of the fan blade body shown in FIG. 2.

FIG. 4 is a partial enlarged plan view of the root and some of the cavities of the fan blade shown in FIGS. 1-7.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
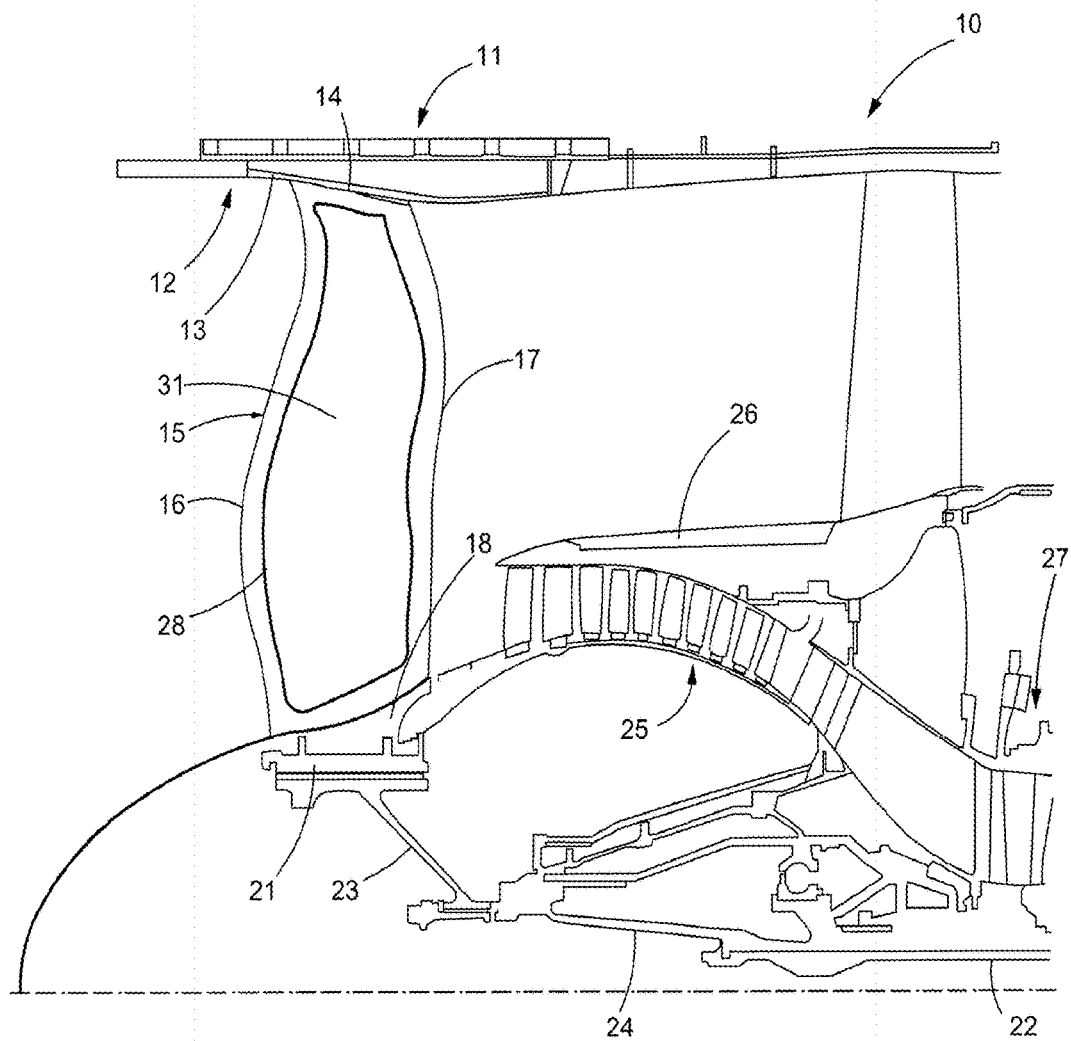
FIG. 1 is a partial sectional of a turbofan as turbine engine illustrating one of the disclosed fan blades.

FIG. 1 illustrates part of a turbofan gas turbine engine 10. The engine 10 may include a nacelle 11 which may be lined with a fan case 12 that may include an abradable liner 13 for abuttingly engaging a tip 14 of a fan blade 15 as shown in FIG. 1. The fan blade 15 may include a leading edge 16, a trailing edge 17 and a base or root 18, which may be coupled to a rotor 21. The rotor 21 may be coupled to the low-pressure shaft 22 via the fan shaft 23 and fan shaft extension 24. Also shown in FIG. 1 is the low-pressure compressor 25, annular bypass duct 26 and part of the high-pressure compressor 27. Downstream components such as a combustor and high and low-pressure turbines are not shown.

In addition to leading and trailing edges 16, 17 of the fan blade 15, FIG. 1 also shows the convex or suction side 28 of the fan blade 15, which is illustrated in greater detail in FIG. 2. FIG. 1 further illustrates a cover 31 that may be disposed over the suction (or convex) side 28 of the fan blade 15. The cover 31 is explained in greater detail in connection with FIG. 3.

Turning to FIG. 2, the fan blade 15 may include an airfoil 32 that may be connected to a root 18. The airfoil 32 may include a generally convex or suction side 28 as well as a generally concave or pressure side (not shown). The airfoil 32 includes a leading edge 16, a trailing edge 17 and a tip 14. To save weight, the airfoil 32 may include a plurality of cavities shown generally at 33. Instead of a plurality of cavities 33, the airfoil 32 may also include a single cavity. If a plurality of cavities 33 is included, intersecting walls 34 may be included to divide the cavities 33 and contribute to the structural integrity of the airfoil 32. The airfoil 32 may be fabricated from titanium, a titanium alloy, aluminum, an aluminum alloy or other suitable materials, including composite materials, that will be apparent to those skilled in the art.

For aerodynamic purposes, the cavity or cavities 33 may be covered with a robust, yet lightweight cover 31 as shown in FIGS. 1 and 3. Turning to FIG. 3, the cover 31 may also include a leading edge 36, a trailing edge 37, a distal end 38, and a proximal end 39. To provide a smooth transition between the cover 31 and the airfoil 32, a coating (not shown) may be applied over the cover 31.

Typically, the cover 31 may be fabricated from a fiber/resin composite material such as carbon fiber reinforced polymer (CFRP) and/or glass fiber reinforced polymer (GFRP) or an elastomer, such as a fluropolymer elastomer like VITON®. Alternatively, the cover 31 may be metallic, such as, but not limited to, aluminum, titanium, or various alloys thereof. If the cover 31 is fabricated from a metal or alloy, an additional coating may be optional. However, an additional coating may be applied over the cover 31 if the cover is fabricated from a CFRP, GFRP, fluropolymer elastomer or other composite materials.

Figure 5:
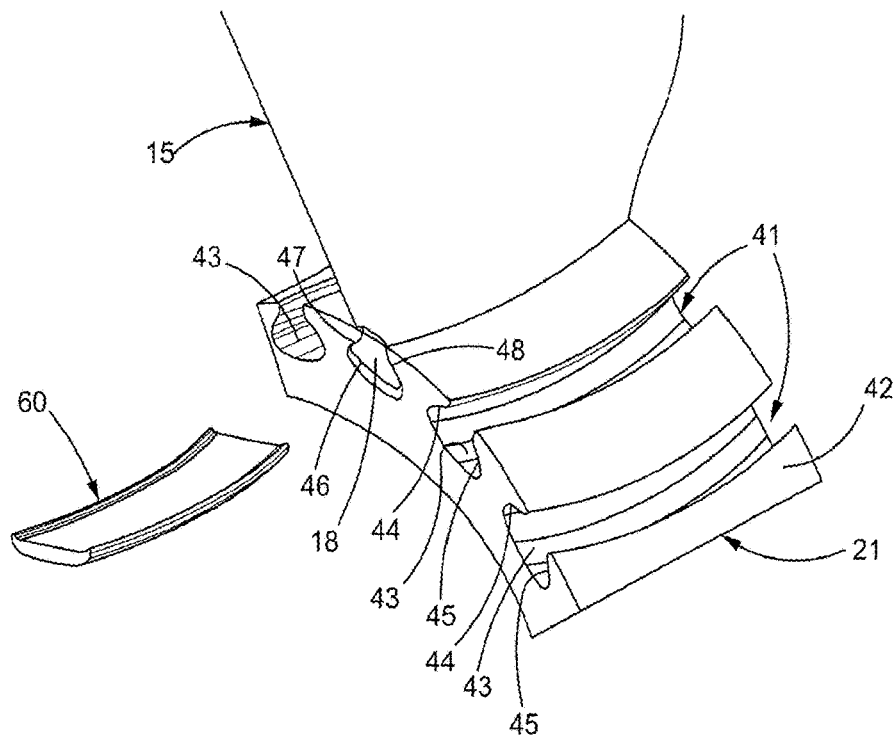
FIG. 5 is a partial perspective view of the fan blade shown in FIGS. 1-2, the rotor shown in FIG. 1 and a spacer that fits between the root of the fan blade and the base surface or inner surface of the slot in the rotor, which accommodates the root of the fan blade.
Figure 6:
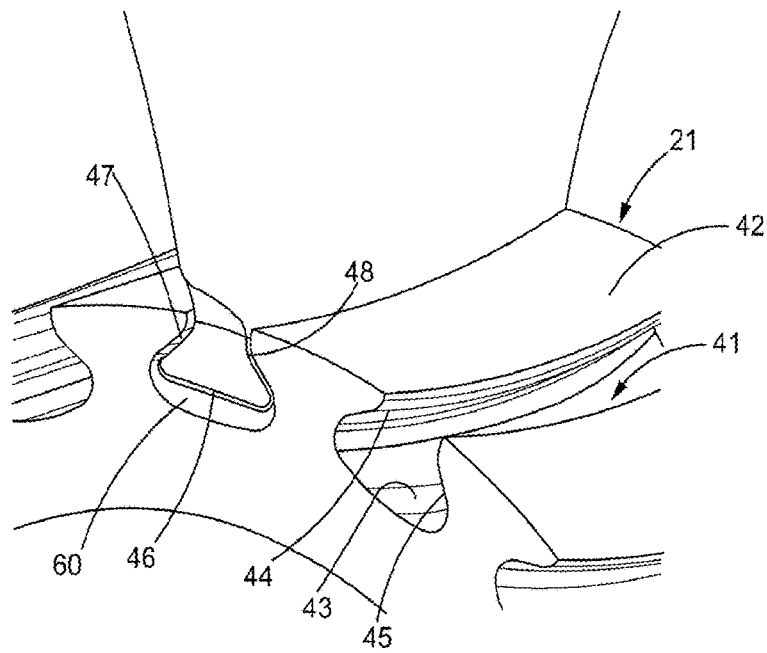
FIG. 6 is another partial perspective view of the fan blade shown in FIGS. 1-2 and 5, the rotor shown in FIG. 1 and the spacer that fits between the root of the fan blade and the base surface of the slot in the rotor that accommodates the fan blade.

Turning to FIGS. 5-6, the fan blades 115 may be mounted to the rotor 21 using dovetail-shaped slots 41 and a complementary dovetail-shaped root 18. White dovetail shaped slots 41 are shown herein, the reader will note that other types of slots, including but not limited to fir tree shaped slots and correspondingly shaped roots are also clearly applicable to this disclosure and are considered within the spirit and scope of this disclosure.

Still referring to FIG. 5, the rotor 21 may include an outer periphery 42 through which the plurality of dovetail shaped slots 41 extend. The slots 41 may each include inner base surfaces 43. The base surfaces 43 may each be disposed between inwardly slanted sidewalls 44, 45 that extend inwardly towards each other as they extend radially outwardly from their respective base surfaces 43 to the outer periphery 42 of the rotor 21. As also shown in FIGS. 5-6, the slots 41 may each accommodate a correspondingly shaped root 18 of a fan blade 15. The root 18 may include an inner face 46 that may be disposed between and connected to inwardly slanted pressure faces 47, 48. Due to centrifugal forces, the pressure faces 47, 48 may each engage the inwardly slanted sidewalk 44, 45 respectively of their respective slot 41 of the rotor 21 when the rotor 21 is rotating.

Turning to FIG. 4, a partial view of the disclosed fan blade includes a plurality of through holes 51 that extend from the inner face 46 of the root 18 into one of the cavities 43. Further, one or more of the through holes 51 may be copped with a plug 50 at the inner face 46 of the root 18 to prevent the migration of condensation. In the illustration of FIG. 4, the fan blade 15 includes six such through holes 51 that extend from the inner face 46 of the root 18 into three of the cavities 43. The through holes 51 reduce the weight of the fan blade 15 and therefore the operating costs. Further, the through holes 51 reduce stress concentration. Additional holes are shown at 52 which extend from the inner face 46 of the root 18 into the airfoil portion 32 of the fan blade 15 but which do not enter a cavity 33. These additional holes may be provided for weight reduction purposes. However, the holes 52 may need to have spherical bottoms or distal ends 53, which are expensive to fabricate and difficult to inspect, in contrast, the through holes 51 may be formed from the inner face 46 into the cavities 33, and therefore the through holes 51 do not require a spherical or semi-spherical bottom and, consequently, are easier to fabricate and easier to inspect.

Returning to FIGS. 5-6, it may be desirable to provide a cover for the through holes that extend through the inner face 46 of the root 18 as illustrated in FIG. 4. One convenient way to provide a cover is to utilize a spacer 60 as illustrated in FIGS. 5-6. The spacer 60 is accommodated in a slot 41 between the inner face 46 of the root 18 and the base surface 43 of the slot 41.

While only certain embodiments of been set forth, alternative embodiments and various modifications will be apparent from the above description to those skilled in the art. These and other alternatives are considered equivalents and within the spirit and scope of the present disclosure.

What is claimed:

1. A fan blade comprising:
an airfoil connected to a root;
the airfoil including a pressure side and a suction side, the suction side including at least one cavity;
at least one through hole extending through the root to the cavity; and
a cover disposed over the cavity and adhered to the suction side of the airfoil.

2. A fan blade comprising:
an airfoil connected to a root;
the airfoil including a pressure side and a suction side, the suction side including at least one cavity;
at least one through hole extending through the root to the cavity, wherein the root includes an inner face disposed between and connected to a pair of pressure faces that extend from the inner face to the airfoil; and
the through hole extending from the inner face of the root to the cavity, wherein the through hole is plugged with a plug at the inner face.

3. The fan blade of claim 1 wherein the cavity includes a plurality of cavities.

4. The fan blade of claim 3 further including a plurality of through holes, each through hole extending from the root to one of the cavities.

5. The fan blade of claim 1 wherein the through hole is plugged.

6. The fan blade of claim 1 wherein the cover is fabricated from a fluoroelastomer.

7. The fan blade of claim 1 wherein the cavity includes at least three cavities, and the through hole includes at least six through holes with two through holes extending from the root to each cavity.

8. The fan blade of claim 1 further including at least one hole that extends from the root into the airfoil but which terminates short of the cavity.

9. The fan blade of claim 1 wherein the cavity includes a plurality of cavities, and the through hole includes a plurality of through holes, each through hole extending from the root to one of the cavities; and at least one hole that extends from the root into the airfoil but which terminates short of any of the plurality of cavities.

10. A fan blade assembly comprising:
a hub coupled to a plurality of radially outwardly extending fan blades, each fan blade including an airfoil connected to a root, the airfoil including a pressure side and a suction side;
the suction side including at least one cavity;
at least one through hole extending from the root to the cavity; and
at least one hole that extends from the root into the airfoil but which terminates short of the cavity.

11. The fan blade assembly of claim 10 wherein each root includes an inner face disposed between and connected to a pair of pressure faces that extend from the inner face to the airfoil; and the through hole extending from the inner face of the root to the cavity.

12. The fan blade assembly of claim 11 further including a spacer disposed between the hub and the inner face of the root, the spacer covering one end of the through hole.

13. The fan blade assembly of claim 10 wherein the through hole is plugged.

14. The fan blade assembly of claim 10 wherein the cavity includes a plurality of cavities and a plurality of through holes, each through hole extending from the root to one of the cavities.

15. The fan blade assembly of claim 10 wherein the cavity includes at least three cavities, and the through hole includes at least six through holes with two through holes extending from the root to each cavity.

16. The fan blade assembly of claim 10 wherein the cavity includes a plurality of cavities, and the through hole includes a plurality of through holes, each through hole extending from the root to one of the cavities; and at least one hole that extends from the root into the airfoil but which terminates short of any of the plurality of cavities.

17. The fan blade assembly of claim 10 wherein the cavity includes a plurality of cavities, and the through hole includes a plurality of through holes, each through hole extending from the root to one of the cavities; and a plurality of holes that extends from the root into the airfoil but which terminate short of any of the plurality of cavities.

18. A method for fabricating a fan blade of a gas turbine engine, the method comprising:
manufacturing a body including an airfoil connected to a root, the airfoil including a pressure side and a suction side, the suction side including at least one cavity;
forming at least one through hole through the root and into the cavity; and
covering the cavity with a cover.

19. The method as in claim 18, wherein the root includes an inner face disposed between and connected to a pair of pressure faces that extend from the inner face to the airfoil; and
the at least one through hole extends from the inner face of the root to the cavity, wherein the through hole is plugged with a plug at the inner face.

* * * * *